(12) United States Patent
Hsai

(10) Patent No.: US 7,413,212 B2
(45) Date of Patent: Aug. 19, 2008

(54) TRAILER THEFT-THWARTING COUPLING DOCK

(75) Inventor: Chin-Hui Hsai, Chang Hua (TW)

(73) Assignee: Handyway Co., Ltd., Chang Hua (TW)

( * ) Notice: Subject to any disclaimer, the term of this patent is extended or adjusted under 35 U.S.C. 154(b) by 395 days.

(21) Appl. No.: 11/333,408

(22) Filed: Jan. 18, 2006

(65) Prior Publication Data

US 2007/0175246 A1 Aug. 2, 2007

(51) Int. Cl.
*B60D 1/06* (2006.01)
*B60D 1/60* (2006.01)
(52) U.S. Cl. .................. 280/507; 280/512; 280/506; 280/511
(58) Field of Classification Search .......... 280/512, 280/507, 506, 511
See application file for complete search history.

(56) References Cited

U.S. PATENT DOCUMENTS

| 2,542,643 | A | * | 2/1951 | Duncan | 280/513 |
|---|---|---|---|---|---|
| 4,239,252 | A | * | 12/1980 | Huetsch et al. | 280/446.1 |
| 4,241,936 | A | * | 12/1980 | Carruthers et al. | 280/507 |
| 4,416,467 | A | * | 11/1983 | Bradley | 280/512 |
| 5,573,263 | A | * | 11/1996 | Denny et al. | 280/509 |
| 5,632,501 | A | * | 5/1997 | Jackson et al. | 280/508 |
| 5,887,885 | A | * | 3/1999 | Byers et al. | 280/512 |
| 6,352,279 | B1 | * | 3/2002 | Ebey | 280/513 |
| 6,505,848 | B1 | * | 1/2003 | Brown et al. | 280/512 |
| 7,353,671 | B2 | * | 4/2008 | Recknagel et al. | 70/34 |
| 2003/0025297 | A1 | * | 2/2003 | Brown et al. | 280/511 |
| 2005/0178173 | A1 | * | 8/2005 | Kuo | 70/58 |

* cited by examiner

*Primary Examiner*—Lesley D. Morris
*Assistant Examiner*—Marlon Arce-Diaz
(74) *Attorney, Agent, or Firm*—Troxell Law Office

(57) ABSTRACT

An improved trailer theft-thwarting coupling dock to prevent unauthorized coupling and hauling of the trailer coupling dock includes a coupling dock body, a upper mechanism, a lower mechanism and a lock assembly. The upper mechanism has a upper handle fastening to the lock assembly. Through locking and unlocking of the lock assembly, unauthorized opening of the upper mechanism can be prevented. Thereby the trailer coupling dock cannot be coupled and hauled unless authorized, and an improved theft-thwarting effect can be achieved for the trailer.

4 Claims, 4 Drawing Sheets

TRAILER THEFT-THWARTING COUPLING DOCK

BACKGROUND OF THE INVENTION

1. Field of the Invention

The invention relates to an improved trailer theft-thwarting coupling dock and particularly to a trailer theft-thwarting coupling dock to prevent unauthorized coupling and hauling thereof.

2. Description of the Prior Art

The conventional trailer coupling dock such the one disclosed in U.S. Pat. No. 6,505,849 has a coupling dock mating a spherical seat to couple with a trailer. The coupling dock has a lever mechanism to actuate a lower latch member beneath the coupling dock to enable the coupling dock and the spherical seat to be separated or latched so that the trailer can be disconnected or connected as desired.

The conventional trailer coupling dock mentioned above confines the spherical seat in a spherical cap of the coupling dock through the lever mechanism to actuate the lower latch member. The lever mechanism presses the lower latch member at a desired location, but does not have any theft-thwarting structure. Any person can easily disengage the coupling relationship. As a result, the trailer could be stolen and towed away easily.

SUMMARY OF THE INVENTION

In view of the aforesaid disadvantages occurred to the conventional techniques, the present invention aims to provide a trailer coupling dock that cannot be coupled and hauled easily to prevent the trailer from being stolen. The invention includes a coupling dock body, a upper mechanism, a lower mechanism and a lock assembly. The upper mechanism has a handle coupling with the lock assembly. Through locking and unlocking of the lock assembly, unauthorized opening of the upper mechanism can be prevented. Thereby an improved theft-thwarting effect can be achieved.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
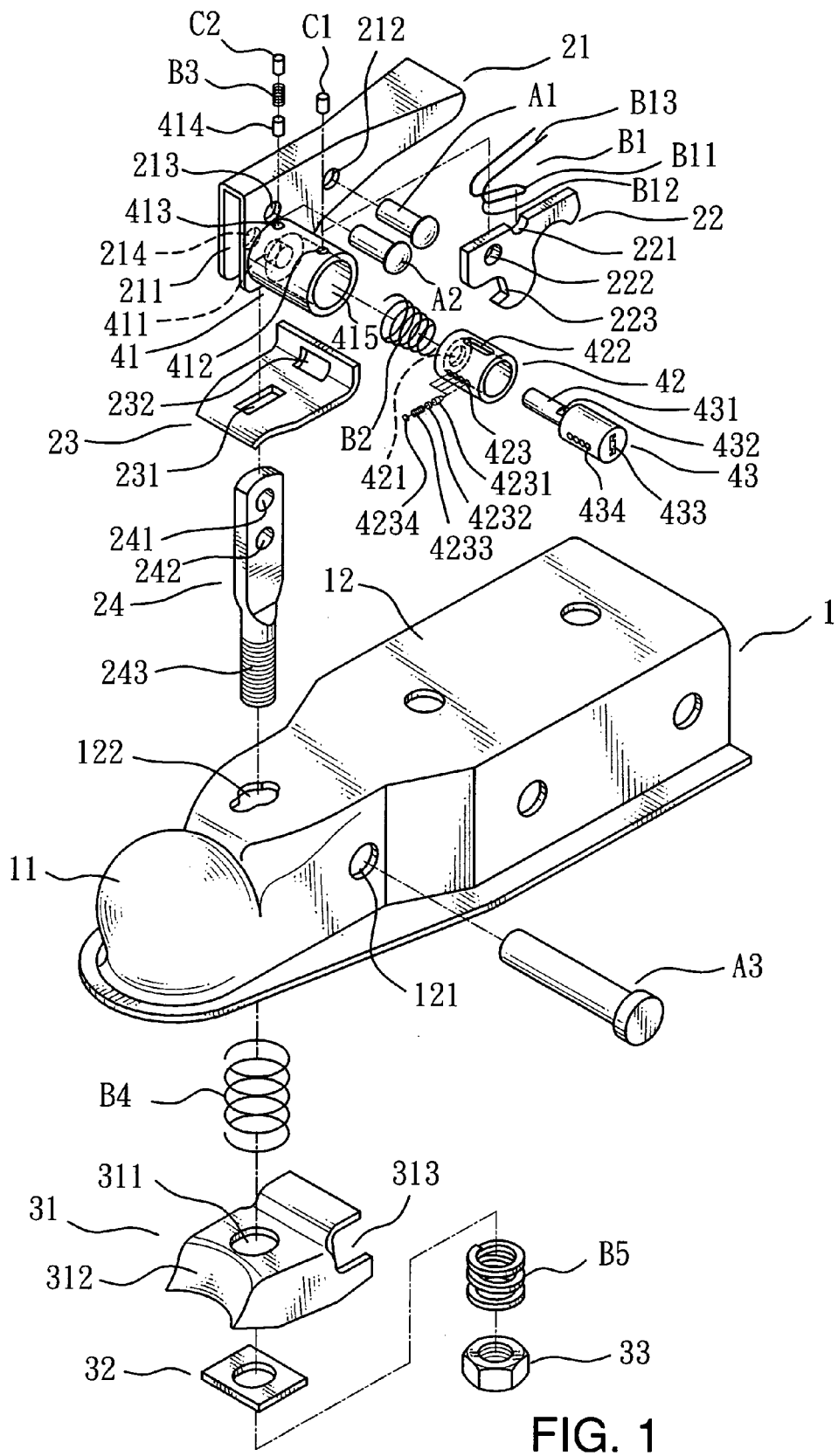
FIG. 1 is an exploded view of the invention.
Figure 2:
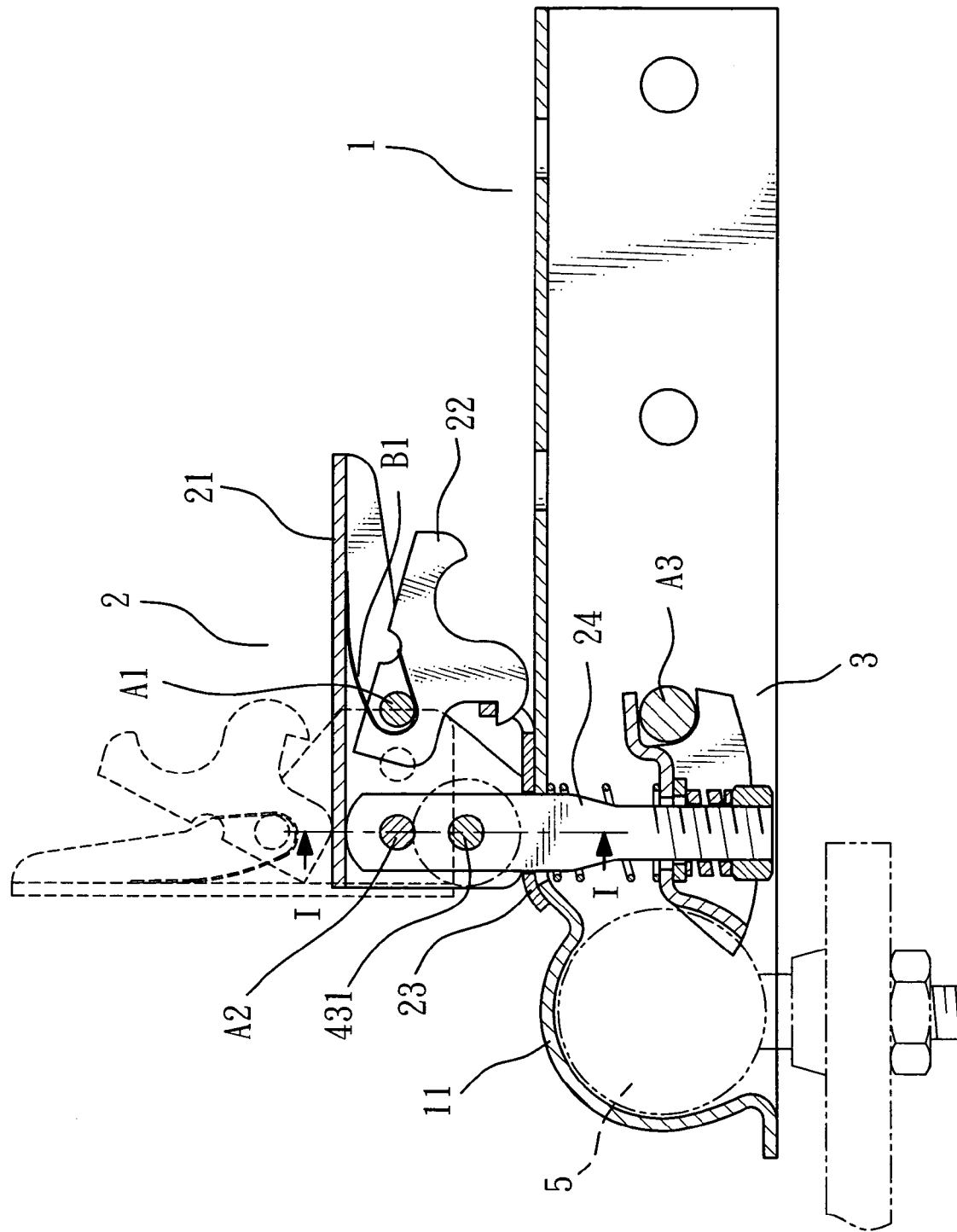
FIG. 2 is a sectional view of the invention in an operating condition.

Referring to FIGS. 1 and 2, the invention includes a coupling dock body 1, a upper mechanism 2, a lower mechanism 3 and a lock assembly 4.

The coupling dock body 1 has a spherical cap 11 on one side which is extended rearwards to form a coupling portion 12. The coupling portion 12 has a third axle hole 121 running through thereof transversely close to the spherical cap 11 to receive a third axle A3, and a draw bar aperture 122 on a upper side.

The upper mechanism 2 includes:

a upper handle 21 which is hollow and has a housing space 211 inside, a first axle hole 212 and a second axle hole 213 formed respectively on two corresponding sides of the housing space to be run through respectively by a first axle A1 and a second axle A2, and a first fastening hole 214 below the second axle hole 213;

a lower handle 22 which has a notch 221 on a upper edge to engage with a first end B11 of a first spring B1, a round hole 222 on a front end corresponding to the first axle hole 212 of the upper handle 21 to be run through by the first axle A1 and to be latched by a second end B12 of the first spring B1. The first spring B1 has a third end B13 to push the upper handle 21. The lower handle 22 further has a latch hook 223 on a lower side;

a upper latch blade 23 which has a first opening 231 on one side and a second opening 232 on another side. The second opening 232 is latchable by the latch hook 223 of the lower handle 22; and a draw bar 24 which runs through the draw bar aperture 122 of the coupling dock body 1 and is movable therein up and down. The draw bar 23 has a first aperture 241 and a second aperture 242 on a upper portion, and a screw thread portion 243 on a lower portion. The upper portion of the draw bar 24 runs through the first opening 231 of the upper latch blade 23, and then the first aperture 241 is run through by the second axle A2.

The lower mechanism 3 includes a fourth spring B4, a lower latch blade 31, a washer 32, a fifth spring B5 and a nut 33 that are coupled on the lower portion of the draw bar 24 in this order. The lower latch blade 31 has an aperture 311 to be run through by the draw bare 24 to fasten to the nut 33. The lower latch blade 31 has an arched notch 312 on a front edge and a notch 313 on a rear edge to be coupled with the third axle A3;

The lock assembly 4 includes:

a housing 41 which has one end fastened to the handle 21 on the periphery of the first fastening hole 214, a housing chamber 415, a second fastening hole 411 corresponding to the first fastening hole 214, a first pin hole 412 and a second pin hole 413 on a upper side to be coupled respectively with a first pin C1 and a second pin C2, and a third spring B3 and a detent member 414;

a second spring B2 held in the housing chamber 415 of the housing 41;

a lock cylinder 42 which is held in the housing 41 and has one side pressing the second spring B2, a third fastening hole 421 on a front side, and a flute 422 on a upper side to be coupled with the first pin C1 of the housing 41 so that the lock cylinder 42 can slide forwards and rearwards within a confined limit. The lock cylinder 42 further has at least one fastening pin hole 423 to hold a lower fastening pin 4231, a upper fastening pin 4232, a spring 4233 and an a fastening pin 4324; and a core 43 which has a locking bolt 431 on a front portion and a key way 433 on a rear end to receive a key. The locking bolt 431 has a detent trough 432 on a upper side. The core 43 further has one or more second fastening pin hole 434 corresponding to the first fastening pin hole 423 of the lock cylinder 42.

By means of the construction set forth above, the upper handle 21 can be moved upwards and downwards to drive the draw bar 24 up and down. Then the lower latch blade 32 of the lower mechanism 3 can clip a spherical dock 5 in the spherical cap 11 of the coupling dock body 1, or allows the spherical dock 5 to be separated from the spherical cap 11. The operation is same as the conventional techniques, details are omitted.

Figure 4:
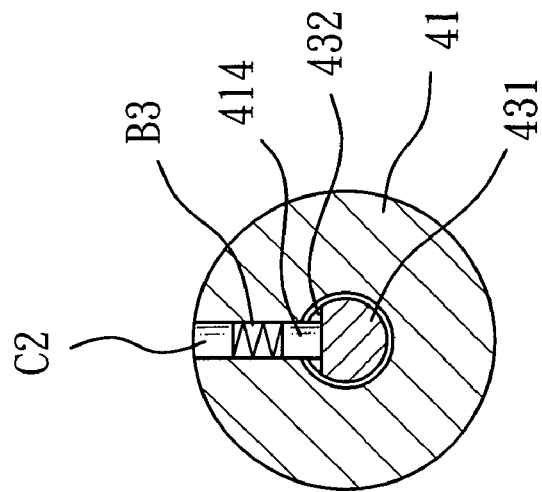
FIG. 4 is a cross section taken on line II-II in FIG. 3.
Figure 3:
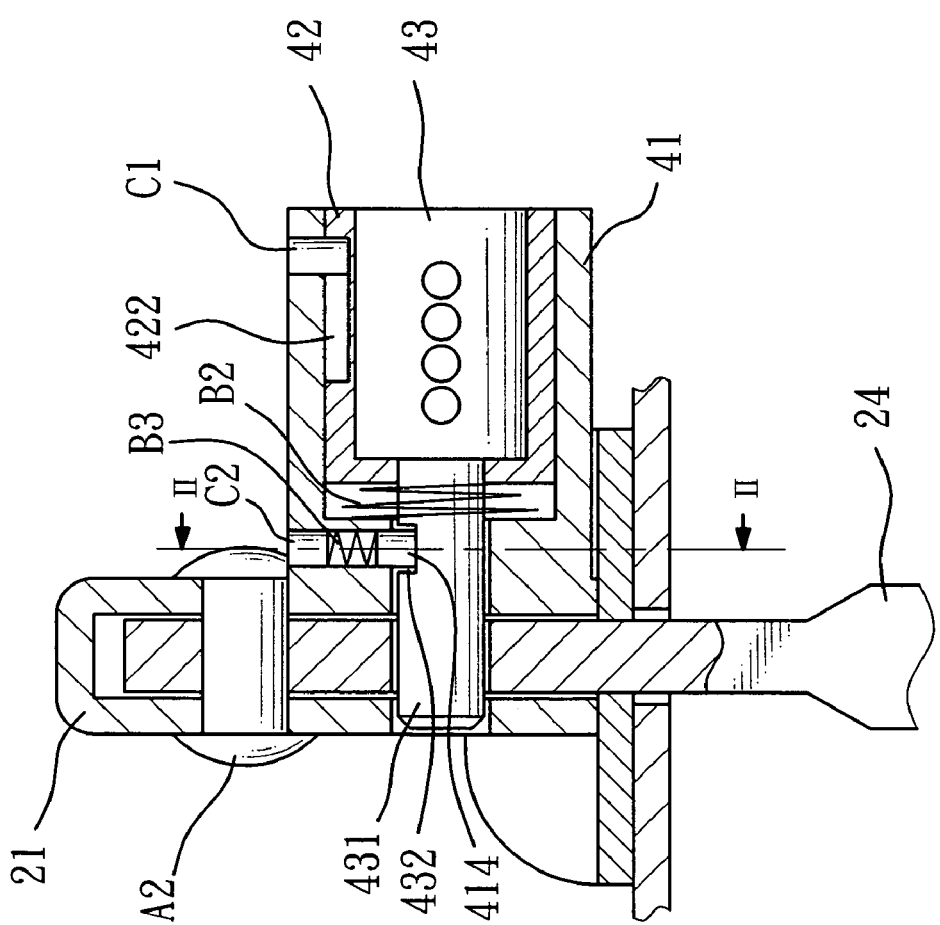
FIG. 3 is a cross section taken on line I-I in FIG. 2.
Figure 6:
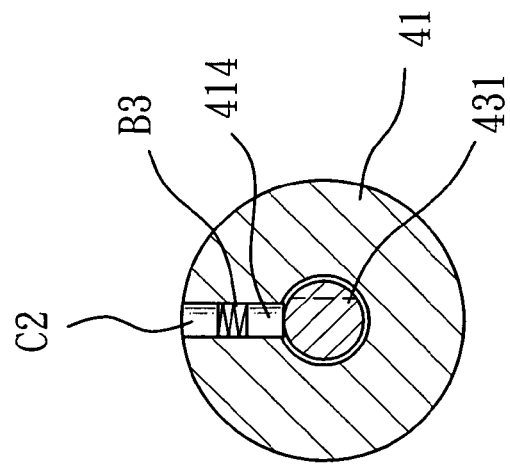
FIG. 6 is a cross section taken on line III-III in FIG. 5.
Figure 5:
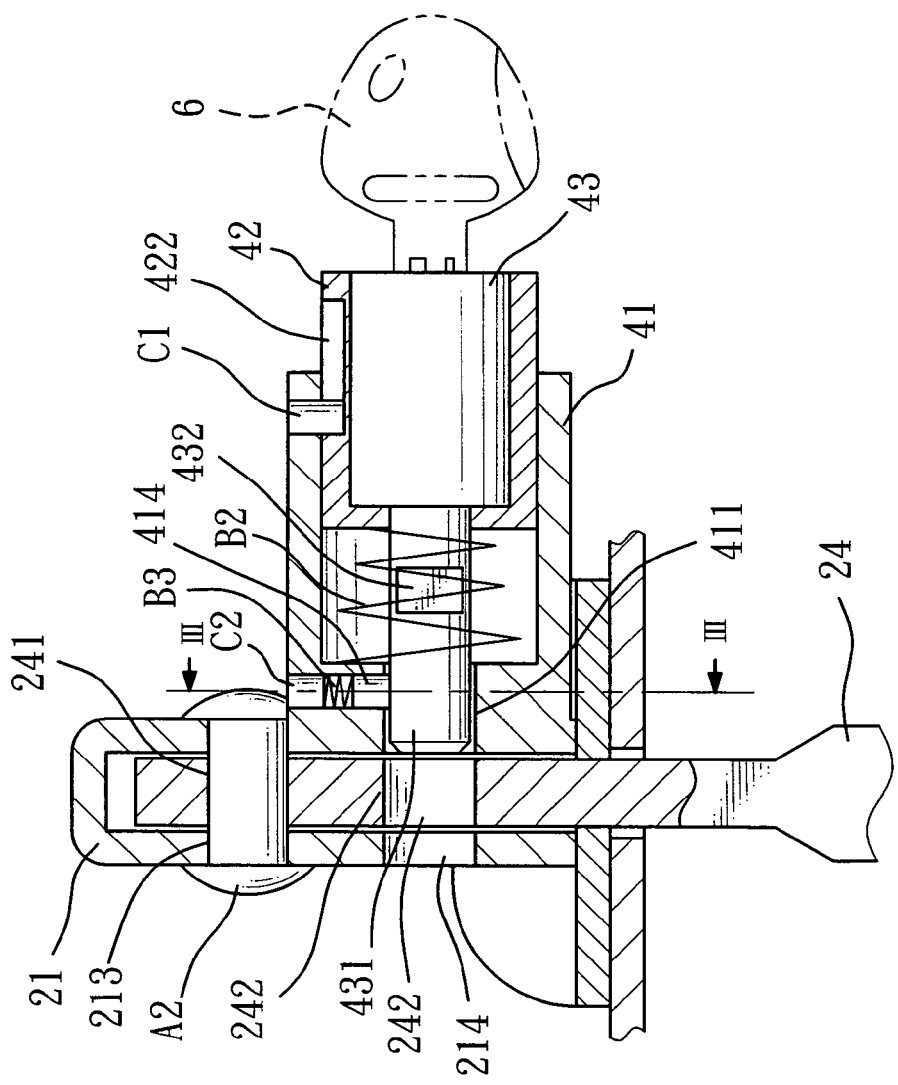
FIG. 5 is a sectional view of the invention showing a unlocking condition.

Referring to FIGS. 3 and 4, to lock the upper mechanism 2 through the lock assembly 4, push the core 43 inwards; the locking bolt 431 runs through, in this order, the third fastening hole 421, second fastening hole 411, first fastening hole 214 and second aperture 242 of the draw bar 24, the detent member 414 in the second pin hole 413 is pushed by the third spring B1 to wedge in the detent trough 432 of the locking bolt 431 to form a latched condition; then turn the core 43 and remove the key 6 to finish the locking operation. In such a condition, the upper handle 21 and the draw bar 24 are harnessed and cannot be moved upwards. The spherical dock 5 also cannot be separated from the spherical cap 11. On the other hand, to unlock the lock assembly 4, referring to FIGS. 5 and 6, insert a key 6 into the core 43 and turn the core 43; the detent trough 432 of the locking bolt 431 is turned away from the latched condition with the detent member 414, and the harness condition of the locking bolt 431 is released; the lock cylinder 42 is retracted due to the returning elastic force of the second spring B2; with the first pin C1 of the housing 41 confined by the flute 422 of the lock cylinder 42, and the locking bolt 431 is separated from the second aperture 242 of the draw bar 24, the first fastening hole 214 and second fastening hole 411 of the upper handle 21, the upper handle 21 of the upper mechanism 2 can be moved upwards as desired. And the spherical dock 5 also can be separated from the spherical cap 11 in the unlocking condition.

I claim:

1. A trailer theft-thwarting coupling dock, comprising a coupling dock body, a upper mechanism, a lower mechanism and a lock assembly; wherein:

the coupling dock body has a spherical cap on one side which is extended rearwards to form a coupling portion, the coupling portion having a third axle hole running through thereof transversely close to the spherical cap to receive a third axle and a draw bar aperture on a upper side thereof;

the upper mechanism includes:

a upper handle which is hollow and has a housing space inside, a first axle hole and a second axle hole formed respectively on two corresponding sides of the housing space to be run through respectively by a first axle and a second axle, and a first fastening hole below the second axle hole;

a lower handle which has a notch on a upper edge to hold a first spring, a round hole on a front end corresponding to the first axle hole of the upper handle to be run through by the first axle and latched by the first spring, and a latch hook on a lower side, the first spring pushing the upper handle,;

a upper latch blade which has a first opening on one side and a second opening on another side, the second opening being latchable by the latch hook of the lower handle; and a draw bar which runs through the draw bar aperture of the coupling dock body and is movable therein up and down, and has a first aperture and a second aperture on a upper portion, and a screw thread portion on a lower portion, the upper portion of the draw bar running through the first opening of the upper latch blade to allow the first aperture to be run through by the second axle;

the lower mechanism includes a fourth spring, a lower latch blade, a fifth spring and a nut that are coupled on the lower portion of the draw bar in this order, the lower latch blade having an aperture to be run through by the draw bare to fasten to the nut;

the lock assembly includes:

a housing which has one end fastened to the upper handle on the periphery of the first fastening hole, a housing chamber, a second fastening hole corresponding to the first fastening hole;

a second spring held in the housing chamber of the housing;

a lock cylinder which is held in the housing and has one side pressing the second spring, and a third fastening hole on a front side; and a core which has a locking bolt on a front portion, the locking bolt having a detent trough on a upper side thereof.

2. The trailer theft-thwarting coupling dock of claim 1, wherein the housing has a first pin hole on a upper side to hold a first pin.

3. The trailer theft-thwarting coupling dock of claim 1, wherein the housing has a second pin hole on a upper side to hold a second pin, a third spring and a detent member.

4. The trailer theft-thwarting coupling dock of claim 1, wherein the locking cylinder has a flute.

* * * * *